Nov. 5, 1957  A. W. FASKE  2,811,727
BEE ROBBER AND QUEEN EXCLUDER
Filed April 26, 1957  2 Sheets-Sheet 1
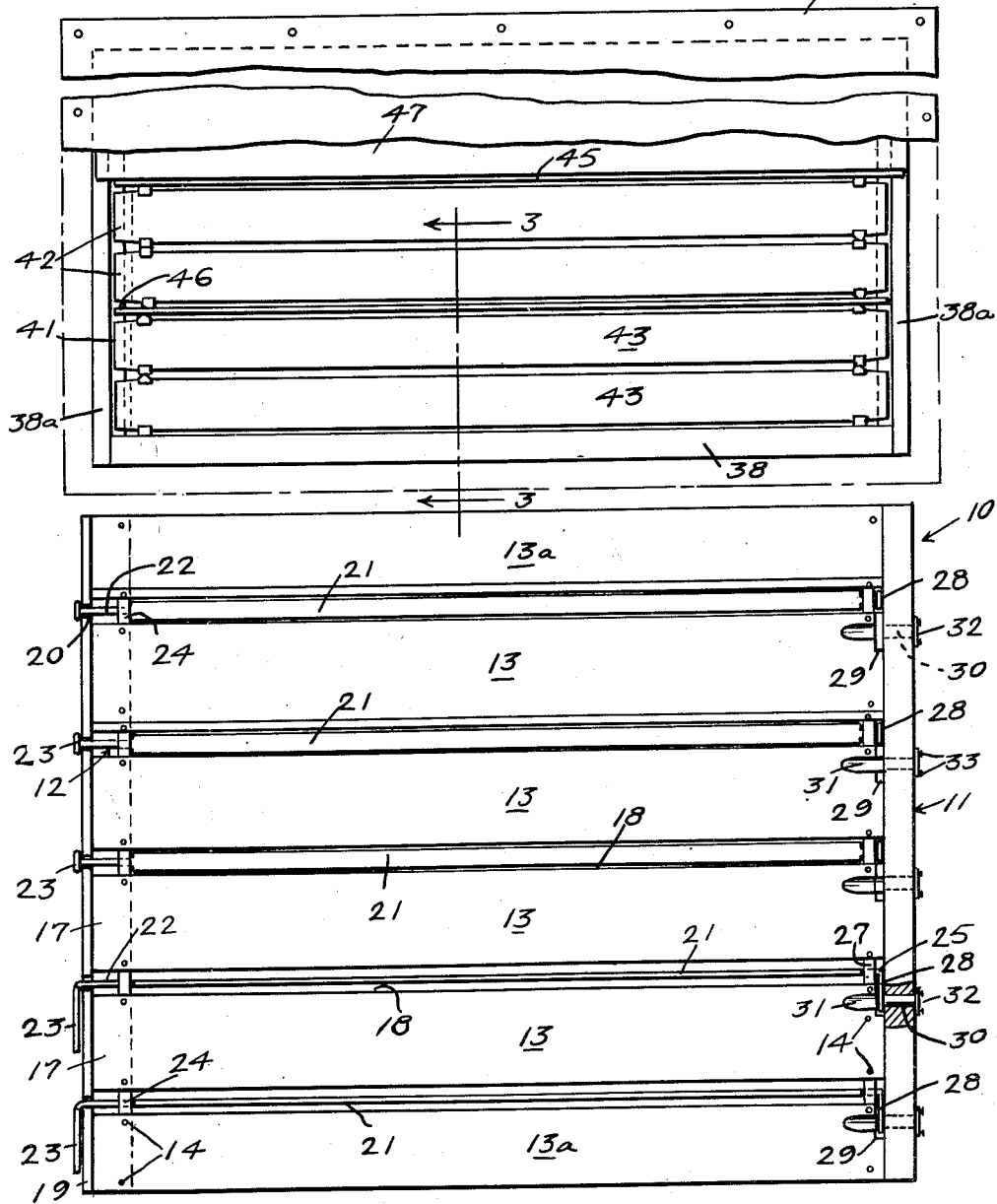
INVENTOR
A. W. Faske
BY John N. Randolph
ATTORNEY

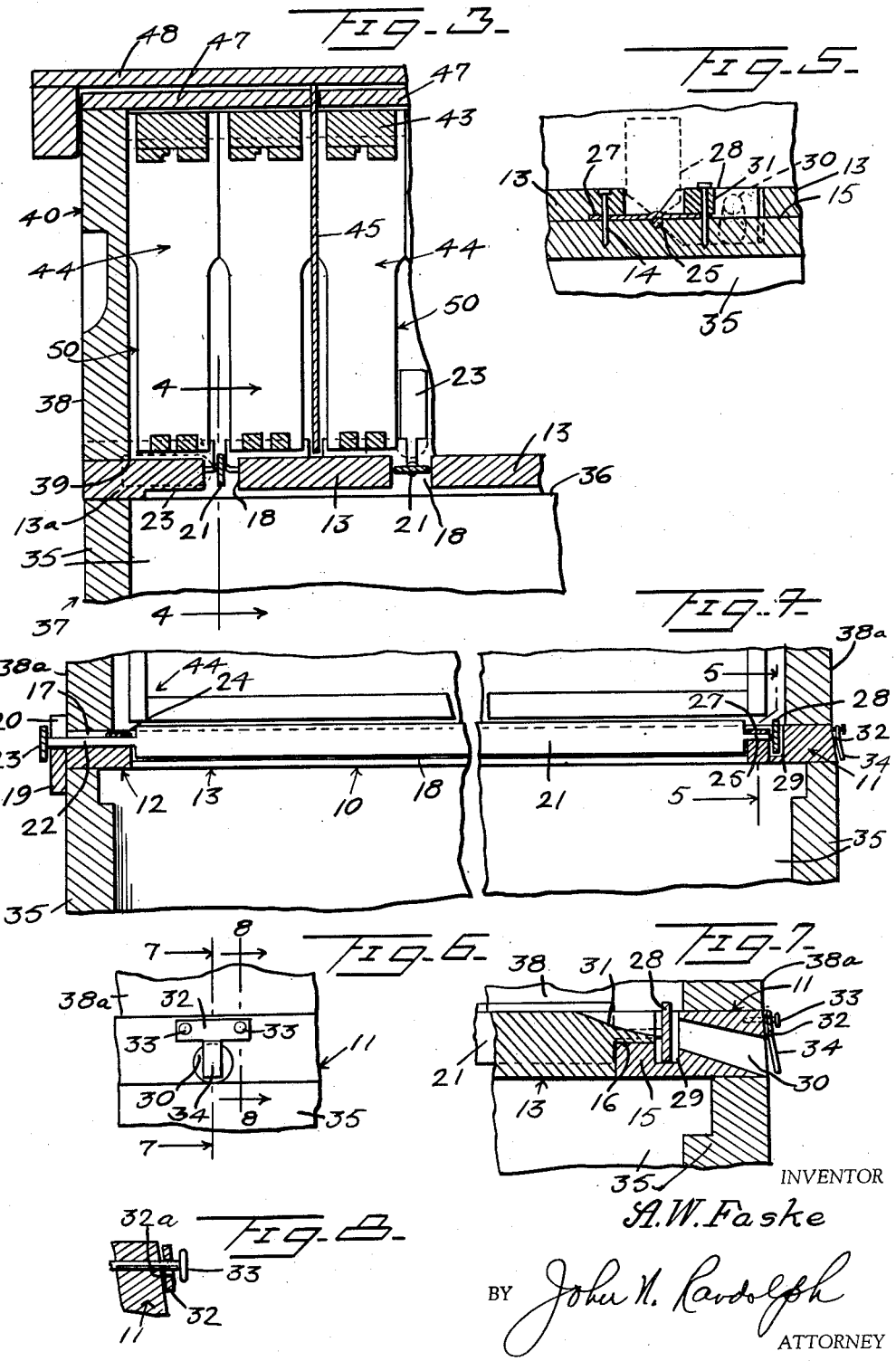

United States Patent Office 2,811,727
Patented Nov. 5, 1957

2,811,727

BEE ROBBER AND QUEEN EXCLUDER

Arthur W. Faske, Borden, Ind.

Application April 26, 1957, Serial No. 655,366

4 Claims. (Cl. 6—4)

This invention relates to a partition unit adapted to be interposed between a hive brood chamber and super and including parts which are adjustable to permit the passage of bees between the brood chamber and super or for preventing the bees from entering the super from the brood chamber or for returning to the brood chamber from the super, but which will permit the bees to escape from the super when prevented by the excluder from returning to the brood chamber from the super.

Another object of the invention is to provide an excluder unit which will at all times prevent the queen bee from entering the super from the brood chamber to thus eliminate the possibility of the queen bee having a brood in the super.

Still a further object of the invention is to provide a bee robber and queen excluder especially constructed to function in conjunction with divider means which are disposed in the super whereby access can be shut off between the hive and a part of the super so that after a period of time the honey containing frames can be removed from the shut off part of the super and replaced with empty frames without disturbing movement of the bees to and from the brood chamber and the remainder of the super.

Various other objects and advantages of the invention will hereinafter become more fully apparent from the following description of the drawings, illustrating a presently preferred embodiment thereof, and wherein:

Figure 1 is a fragmentary plan view, partly broken away, of the super;

Figure 2 is a plan view of the bee robber and queen excluder unit;

Figure 3 is a fragmentary vertical sectional view taken through a portion of the super, bee robber and queen excluder, and brood chamber, substantially along a plane as indicated by the line 3—3 of Figure 1, and on an enlarged scale;

Figure 4 is a fragmentary vertical sectional view, taken substantially along a plane as indicated by the line 4—4 of Figure 3;

Figure 5 is an enlarged fragmentary vertical sectional view, taken substantially along a plane as indicated by the line 5—5 of Figure 4;

Figure 6 is a fragmentary elevational view looking toward portions of the exteriors of the super, bee excluder and brood chamber and on an enlarged scale relative to Figure 4, and Figures 7 and 8 are fragmentary vertical sectional views, taken substantially along planes as indicated by the lines 7—7 and 8—8, respectively, of Figure 6.

Referring more specifically to the drawings, the bee robbing and queen excluding unit in its entirety is designated generally 10 and includes spaced substantially parallel sills 11 and 12. A plurality of slats 13 extend between the sills 11 and 12 and have their ends disposed on portions of said sills and secured thereto by fastenings 14. The upper surface of the inner edge portion of the sill 11 is recessed as seen at 15 and the slats 13 have corresponding undercut ends 16 which rest on the recessed sill portion 15 and through which the fastenings 14 extend for securing said slat ends to the sill 11. The slats 13 have undercut opposite ends 17 which engage on the upper surface of the sill 12 and through which parts other of the fastenings 14 extend for securing the slats to said sill 12. The two outermost slats 13a have outer portions of a thickness substantially equal to the thickness of the sill 11 and greater than the thickness of the sill 12, but approximately equal to the thickness of said sill 12 plus the thickness of the undercut end portions 17. The slats 13 are secured to the sills 11 and 12 in spaced apart relation to one another to form slots 18 therebetween which constitute passages, as will hereinafter be described. A strip 19 is secured along the outer edge of the sill 12 and extends upwardly to above the level of the slats 13, as seen in Figure 4. The strip 19 is provided with upwardly opening notches 20 which align with the slots 18.

An excluder bar 21 extends longitudinally through each slot or passage 18. The excluder bars 21 have restricted stems 22 at corresponding ends thereof which extend across the upper surface of the sill 12 and outwardly through the notches 20. A handle 23 is secured to the outer end of each stem 22 and is disposed crosswise of the bar 21 and on the outer side of the strip 19. Metal bearing strips 24 extend across portions of the upper surface of the sill 12 which are disposed between the slats 13, and are secured to the slats and sill 12 by certain of the fastenings 14. Said bearing strips 24 extend over the stems 22 and combine with portions of the sill 12 to form journals in which the stems 22 are turnably disposed. Opposite ends of the bars 21 have restricted extensions or stems 25 which extend substantially across portions of the upper surface of the recessed sill portion 15 and which are turnably disposed beneath bearing strips 27, which are mounted on the sill portion 15 in the same manner that the bearing strips 24 are mounted on the sill 12. The stems 25, beyond the bearing strips 27, are provided with laterally projecting plates 28 forming closures. The sill portion 15 and slat ends which are secured thereto are recessed to provide upwardly opening recesses 29 into which the closures 28 are swingably movable, as seen in Figures 2, 4, 5 and 7. The sill 11 is provided with bores 30 which extend transversely therethrough and which have inner ends opening into the recesses 29. A bore 30 is formed in alignment with each slat 13 and said slats 13 are provided with inclined grooves 31 in their upper surfaces which align with the bores 30 and which likewise communicate with the recesses 29, so that the communicating grooves 31, recesses 29 and bores 30 form passages for a purpose which will hereinafter be described.

A T-shaped closure member 32, as best seen in Figure 6, is loosely secured by fastenings 33 to the outer side of the sill 11, above the open outer end of each bore 30. The closures 32 have depending bars 34 which extend downwardly across the outer ends of the bores 30, as seen in Figures 6 and 7. The openings 32a of the closures 32, through which the fastenings 33 extend, are sufficiently large, and the heads of said fastenings are sufficiently spaced from the sill 11, as seen in Figure 8, so that the closures 32 may be rocked on the fastenings 33 to swing the bars 34 thereof a sufficient distance away from the outer ends of the bores 30 to permit bees to escape outwardly through the bores 30. However, the bars 34 are normally held by gravity over the outer ends of the bores 30, as seen in Figures 6 and 7, so that bees may not enter the bores 30 through the outer ends thereof.

The bee robber and queen excluder 10 is adapted to be detachably mounted on the upper edges of the walls 35, defining the open top 36 of a hive brood chamber 37, only the upper portion of which has been illustrated, as seen in Figures 3 and 4. The bottom edges of the walls 38 defining the open bottom 39 of a super, designated generally 40, are adapted to rest upon the upper side of the bee robber and queen excluder 10, adjacent the marginal edges thereof, so that the bee robber and queen excluder 10 forms a partition between the open top 36 of the brood chamber 37 and the open bottom 39 of the super 40. Two of the oppositely disposed walls 38a of the super 40 are provided with downwardly offset upwardly facing surfaces 41 on which are adapted to rest the protruding ends 42 of top bars 43 of honey frames 44, which are thus supported within the super 40 and suspended so that the bottoms of the frames 44 are disposed slightly above the slats 13. Between each two frames 44 of the super 40 is mounted a dividing plate 45 having end extensions 46 adjacent its upper edge which rest upon the surfaces 41 for suspending the divider plate 45 between the frames 44, and so that the bottom edge of the divider plate 45 will be disposed in close proximity to the slats 13, as seen in Figure 3. The dividers 45 extend upwardly to above the level of the top bars 43 of the frames 44 and are disposed between strips or panel elements 47 which cover the open top of the hive frame. The super also includes a flanged cover 48 which fits detachably over the top of the super and around the upper portions of the walls 38 and 38a.

As seen in Figure 3, a passage 18 is located beneath each two frames 44 which are separated by a divider 45 to form a passageway between the super 40 and brood chamber 37. When the handles 23 are swung to upright positions, the bars 21 will be disposed in horizontal positions to completely close the passages 18 in which said bars are mounted. When the handles 23 are swung downwardly to horizontal positions, the bars 21 will be disposed in vertical planes for dividing the slots or passages 18 in which said bars are disposed into two passages each of a width slightly less than half the width of the slot 18, and of sufficient width so that a working bee can pass upwardly or downwardly through the passage 18 on either side of its bar 21. However, the passage 18 on either side of the vertically disposed bar is of insufficient width to permit a queen bee to pass therethrough so that the unit 10 at all times excludes the queen bee from access to the super 40 from the brood chamber 37. The closures 28 permit the bars 21 and handles 23 to be swung only in one direction from a vertical position of the handles 23, and so that the closure 28 will be swung downwardly and into its recess 29 when the handle 23 is swung from a vertical to a horizontal position, for moving the excluder bar 21, which forms a part of said closure 28 and handle 23, from a closed horizontal position within its slot 18 to an open vertical position therein. Thus, when the excluder bars 21 are in open positions, in vertical planes, the closures 28 thereof will be in positions for closing the inner ends of the bores 30 to prevent bees from escaping from the super except back into the brood chamber. However, when the excluder bars 21 are in closed positions, in horizontal planes, the closures 28 thereof will be in raised open positions, as illustrated in dotted lines in Figure 5, so that bees trapped within the super may escape therefrom into the surrounding atmosphere.

It will be readily apparent that the individual compartments of the super 40, containing two frames 44, may be shut off from the hive 37 by moving the excluder bar 21 which is located therebeneath to a closed position in a horizontal plane for preventing bees from entering said compartment from the brood chamber or returning to the brood chamber from the compartment. Within twenty-four hours, the bees within such a closed compartment will escape to the atmosphere through the groove 31 and bore 30, after which the two honey-laden frames of such closed compartment may be removed and replaced with empty frames by removing the cover 48 and the plate 47 which is disposed over such sealed compartment 50. It will be apparent that this can be accomplished without disturbing the bees in other open compartments 50. Thus, the separate compartments of the super 40 can be robbed at different times while bees are working in other of the compartments. It will also be readily apparent that the dividers 45 may be omitted, in which case all of the bars 21 would have to be moved to closed positions simultaneously in sufficient time, for example twenty-four hours, prior to when the honey laden frames 44 were to be removed and replaced with empty frames. It will be readily apparent that the bees can push the closure bars 34 outwardly in escaping from the super 40 but, as previously stated, cannot enter the bores 30 past said bars 34.

Various modifications and changes are contemplated and may be resorted to, without departing from the function or scope of the invention as hereinafter defined by the appended claims.

I claim as my invention:

1. In combination with a brood chamber having an open top and a super having an open bottom disposed over the brood chamber, a partition interposed between the brood chamber and super, said partition having elongated transversely spaced slots forming communicating passages between the brood chamber and super, elongated excluder bars disposed in said slots and having restricted stems projecting from the ends thereof and journalled in said partition beyond the ends of the slots for turning movement of the excluder bars in said slots about the axes of said bars, each bar being of a width to close the slot thereof when the bar is disposed in a plane parallel to the plane of said partition and being turnable through an arc of 90° to an open position, each bar in the open position thereof restricting the slot in which it is disposed to a limited extent to prevent the passage of a queen bee therethrough but to permit the passage of other bees between the brood chamber and super, said partition being provided with a bore associated with each slot, said bores being formed in an edge portion of the partition adjacent complementary ends of the slots, each bore opening outwardly of said partition edge and upwardly into the super, said partition having a recess intersecting each bore and disposed crosswise thereof, and a closure fixed to and projecting laterally from one stem of each excluder bar, said closures extending from the stems located at corresponding ends of the excluder bars and each closure being positioned relative to the bore of the slot in which the excluder bar thereof is disposed to assume a position in the recess of the bore for closing said bore when the excluder bar is in an open position and for opening the bore when the excluder bar is in a closed position.

2. In a combination as defined by claim 1, and an auxiliary closure associated with each bore and swingably supported by the partition to permit bees to escape outwardly through the bore, when the first mentioned closure of said bore is in an open position, and for preventing bees from entering the super through said bore.

3. In a combination as defined by claim 2, means detachably mounted in said super for dividing the super into a plurality of separate compartments each adapted to contain one or more honey frames, and each slot and the bore associated therewith communicating with one of the super compartments whereby the excluder bar of said slot is movable to a closed position for shutting off communication between said compartment and the brood chamber and while other of the compartments are in communication with the brood chamber.

4. In a combination as defined by claim 1, and a handle fixed to the other stem of each excluder bar, said handles being disposed beyond another edge portion of the partition and externally of the brood chamber and super and being operable for selectively turning the excluder bars to open or closed positions.

References Cited in the file of this patent

UNITED STATES PATENTS

| | | |
|---|---|---|
| 546,007 | Ferguson | Sept. 10, 1895 |
| 987,425 | Blagg | Mar. 21, 1911 |
| 1,100,847 | Schamu | June 23, 1914 |
| 1,262,779 | Gray | Apr. 16, 1918 |